Patented May 6, 1924.

1,492,713

UNITED STATES PATENT OFFICE.

BETHUNE G. KLUGH, OF CHICAGO, ILLINOIS, ASSIGNOR TO FEDERAL PHOSPHORUS COMPANY, OF BIRMINGHAM, ALABAMA, A CORPORATION OF ALABAMA.

PROCESS FOR THE PRODUCTION OF OXIDES OF PHOSPHORUS.

No Drawing. Application filed June 14, 1920, Serial No. 388,822. Renewed August 23, 1922. Serial No. 583,940.

*To all whom it may concern:*

Be it known that I, BETHUNE G. KLUGH, a citizen of the United States of America, residing at Chicago, in the county of Cook and State of Illinois, have invented certain new and useful Improvements in Processes for the Production of Oxides of Phosphorus, of which the following is a specification.

This invention consists of a process of electrically smelting a mixture of natural phosphates, siliceous flux and carbon so conducted that the phosphorus compounds evolved therefrom may be collected commercially.

I am aware that there are many processes for the smelting of natural phosphates and the volatilization and collection of evolved phosphorus compounds, but in each and every case at times there is evolved along with the gases and the phosphorus volatilized from said smelting, a fume which by its presence with the gases defeats the commercial object of such operation. This fume accompanying that of the phosphoric anhydride, is peculiar to this class of electric smelting operation. It is composed of silica, alumina, lime, magnesia and other constituents of the charge. It is of an entirely distinct nature from that of fine dust from the charge which is entrained in the current of gases and passes out of the furnace therewith. It exists in an infinitely finely divided state, and probably in an allotropic chemical state. When such fume passes over with the normal gases and the phosphorus compounds, it combines with a portion of the phosphoric anhydride and condenses on all surfaces of the gas passages and treating apparatus with which it comes in contact, thereby closing up such passages, which interrupts the operation, requiring long delays, tedious and expensive cleaning, and even replacement of such passage conduits and apparatus before operations can be resumed.

I have found, by operation of electric furnaces of commercial size over long periods for the smelting of natural phosphates with siliceous flux and carbon, and for the collection of oxides of the phosphorus evolved therefrom, that the existence of the hereinabove described fume, with the normal and desired gases and fumes is the direct result of either local or general overheating within the furnace. I find that this overheating can be prevented entirely by the proper control of the manner in which the electrical energy is converted into heat, and by maintenance of uniform depth of stock column within the furnace.

Heretofore, open arcs have been intermittently allowed to prevail in the furnace, or in certain cases have been specifically employed, in deriving the heat from electrical energy for smelting the charge of natural phosphates, siliceous flux and carbon, and also the charge has been either introduced intermittently into the furnace or has been allowed to vary its depth, so that the temperature in the smelting zone would rise abnormally when the stock became abnormally low in the furnace Under open arcing conditions within the furnace charge, or with abnormal surging of current in the slag bath, or with abnormal heat of the charge itself, the fumes above described will be evolved from the charge, any or all of said causes being the occasion for their evolution.

I propose in the herein described process to avoid the evolution of the hereinbefore described fumes, by the following steps, to-wit:

1. I cause the heat to be generated within the furnace by maintaining the tips of the electrodes continuously in contact with a slag of such degree of fluidity that it will provide the requisite resistance to the current to produce and maintain a low range of operating temperature in the furnace of 1200° C. to 1500° C., in contrast with that produced by the arc of 2600° C. and upward.

2. I automatically maintain the charge of uniform depth so that there will be a constant supply of charge to absorb the constant supply of heat from the continuously applied current supply, and I thus avoid the overheating which would result from a diminished supply of stock being unable to absorb the undiminished heat supply.

In order that my invention may be more fully understood and practiced by those skilled in the art, I will now describe a typical charge and explain exactly how the furnace should be controlled in treating it.

I make up a charge of natural phosphate, sand or other siliceous material, and coke on other carbonaceous reducing agent.

I proportion the three above constituents of the charge so that:—

(1) For every pound of silica in the charge, there is either, one and four tenths pounds of lime, or one pound of magnesia, and (2) For every pound of phosphorus in the charge there is one pound of carbon, and for every pound of iron as oxide in the charge, there is thirty-two hundredths pounds of carbon.

My reasons for specifying the above method of proportioning the charge, as related to that given under subhead (1) is that I have found that a slag which corresponds to the empirical chemical or molecular ratio $(CaO)_3—(SiO_2)_2$ and $(MgO)_3—(SiO_2)_2$, which also corresponds to the numerical ratios above specified, will be of the desired fluidity when it is at the temperature desired for the herein described process, and also that it will carry out of the furnace a minimum quantity of the phosphorus smelted therewith.

My reasons for specifying the ratio in regard to the carbon content of the charge is that I have found that the theoretical chemical requirement, corresponding to the empirical formulas,

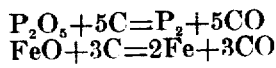

$$P_2O_5 + 5C = P_2 + 5CO$$
$$FeO + 3C = 2Fe + 3CO$$

which also corresponds to the numerical ratio above given in subhead (2), is requisite for reducing and freeing the elemental phosphorus in the charge, when smelted under the conditions of the herein described process, and when appreciably less than that proportion is used, a considerable portion of the phosphorus remains unreduced and is lost in slag, whereas in case an appreciable excess of the specified proportion is used, the said carbon accumulates in the furnace causing great irregularity in furnace operation, destroying the essential electrical control, and defeating all other features of control necessary to make the herein described process a technically or commercially successful operation.

While I do not wish to confine the limits of the hereindescribed invention absolutely to the above proportions, I will state that the closer they are adhered to the better will be the operation.

With the hereinabove described charge, I start the furnace operation in the usual way, and then I keep the furnace charged continuously and of uniform depth over its entire area of activity, and maintain the passage of the current entirely by contact of the electrodes with the underlying slag bath, and maintain substantially constant the quantity of current being delivered into said furnace, so as to avoid any arcs within the charge, or any local or general superheating of the charge, and I preserve all features of control with a view to maintaining a temperature of the slag, in which the heating of the charge originates, between 1200° and 1500° C. By using the slag bath as the heating medium, I obtain a more uniform diffusion of heat throughout the cross section of the furnace. I have found with the operation of the electric furnace with the charge proportioned and with the temperature maintained as above described, that ninety-five per cent of the phosphorus so charged will be reduced and set free as elemental phosphorus, and further that said elemental phosphorus as evolved from the surface of the charge will, upon its oxidation to phosphorus pentoxide, pass out of said furnace into gas mains provided therefor, practically free from accompanying fume of silica and other constituents of the charge, and in such state as to readily submit to direct hydration, temperature control or other treatment and collections measures as required, continuously and commercially.

In a companion application I describe and illustrate a proposed means for maintaining the furnace charge of uniform depth and its feed directly controlled by and responsive to the demands of the fusion zone.

The control of the quantity of current is by regulation of the penetration of the electrodes into the slag bath.

What I claim as new and desire to secure by Letters Patent, is:—

1. The herein described step in a process for smelting phosphatic material in an electric furnace and collecting phosphorus oxides therefrom, which consists in preventing overheating of the furnace charge by avoiding the occurrence of open arcs in the furnace and by converting the electrical energy into heat by passing it throughout the smelting process continuously through a slag bath as the resistance and heat diffusion medium.

2. The herein described step in a process for smelting phosphatic material in an electric furnace and collecting the phosphorus evolved therefrom, which consists in maintaining a slag bath in the furnace and holding the electrode tips continuously in contact therewith to avoid open arcs in the furnace.

3. The herein described step in a process for smelting phosphatic material in an electric furnace and collecting the phosphorus evolved therefrom, which consists in maintaining a slag bath in the furnace and holding the electrode tips continuously in contact therewith, the slag having the requisite fluidity to produce by its resistance to the current flow an operating temperature of from 1200° C. to 1500° C. in the furnace.

4. The herein described step in a process for smelting phosphatic material in an electric furnace and collecting phosphorus oxides therefrom, which consists in maintaining a constant depth of stock above the fusion zone and converting the electrical energy supplied to the furnace into heat wholly by passing it through a slag bath in the furnace.

5. The herein described step in a process for smelting phosphatic material in an electric furnace and collecting phosphorus oxides evolved therefrom, which consists in maintaining a slag having two molecular parts of silica $(SiO_2)_2$ to three molecular parts of a lime or magnesia base $(CaO)_3$ or $(MgO)_3$, maintaining the electrode tips in contact with such slag, and keeping the stock charge above the fusion zone above a predetermined depth.

6. The herein described process of producing oxides of phosphorus by the smelting of a phosphatic material in an electric furnace, which consists in charging phosphatic material carbon and a flux into an electric smelting furnace, preventing overheating of the furnace charge by converting the electrical energy into heat by passing it continuously during the smelting operation through a slag bath as a resistance and heat diffusion medium, thereby avoiding open arcs, and collecting and oxidizing the phosphorus evolved from the furnace charge.

7. The herein described process of producing oxides of phosphorus in an electric furnace, which consists in smelting phosphorus carbon and flux in an electric furnace wholly by heat generated by the resistance of molten slag to the flow of electric current between electrodes maintained continuously in contact therewith, and maintaining the heat substantially uniform by regulating the penetration of the electrodes into the molten slag.

8. The herein described process of producing oxides of phosphorus, which consists in charging into an electric furnace a mixture of natural phosphates, with sufficient carbon for direct reduction of the phosphorus and iron combined therewith, and sufficient silicious flux to produce by combination with the constituents of the charge a freely fluid slag, maintaining throughout the operation of said electric furnace the tips of the electrodes of the furnace in contact with said slag so as to utilize the latter as the medium for the conversion of the electrical energy into heat, oxidizing the elemental phosphorus evolved from said smelting to phosphorus pentoxide, and separating the latter from the accompanying gases.

9. The herein described process of producing oxides of phosphorus, which consists in charging into an electric furnace a mixture of natural phosphates, with sufficient carbon for direct reduction of the phosphorus and iron combined therewith, and sufficient silicious flux to produce by combination with the constituents of the charge a slag having free fluidity between 1200° C. and 1500° C., maintaining throughout the operation of said electric furnace a substantially constant predetermined depth of stock above said slag, maintaining the tips of electrodes of said furnace in contact with said slag so as to utilize the latter as the medium for converting the electrical energy into heat, oxidizing the elemental phosphorus evolved from said smelting to phosphorus pentoxide, and separating said phosphorus pentoxide, from accompanying gases, by hydration and subsequent electrical precipitation or absorption.

In testimony whereof I affix my signature.

BETHUNE G. KLUGH.

Witness:
ALMA LIDE.